(12) United States Patent
Miller et al.

(10) Patent No.: US 6,660,693 B2
(45) Date of Patent: Dec. 9, 2003

(54) METHODS FOR DEWATERING SHALY SUBTERRANEAN FORMATIONS

(75) Inventors: Matthew J. Miller, Missouri City, TX (US); Curtis L. Boney, Houston, TX (US); Kevin W. England, Houston, TX (US); Jerald J. Hinkel, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 65 days.

(21) Appl. No.: 09/925,221

(22) Filed: Aug. 8, 2001

(65) Prior Publication Data

US 2003/0040441 A1 Feb. 27, 2003

(51) Int. Cl.$^7$ ................................................ C09K 3/00
(52) U.S. Cl. ................ 507/136; 507/131; 507/244; 507/261; 507/925; 166/305.1; 166/309
(58) Field of Search ................ 507/136, 131, 507/244, 261, 925; 166/305.1, 309

(56) References Cited

U.S. PATENT DOCUMENTS

| | | | | |
|---|---|---|---|---|
| 4,107,096 A | * | 8/1978 | McEntire | 252/546 |
| 4,330,481 A | | 5/1982 | Timberlake et al. | 260/463 |
| 4,463,807 A | * | 8/1984 | Stoddard | 166/285 |
| 5,229,017 A | | 7/1993 | Nimerick et al. | 252/8.551 |
| 5,602,082 A | | 2/1997 | Hale et al. | 507/115 |
| 5,686,396 A | | 11/1997 | Hale et al. | 507/126 |

OTHER PUBLICATIONS

Anderson, William G. *Wettability Literature Survey—Part 5: The Effects of Wettability on Relative Permeability*, Journal of Petroleum Technology 1453–1468 (Nov., 1987).

Anderson, William G. *Wettability Literature Survey—Part 6: The Effects of Wettability on Waterflooding*, Journal of Petroleum Technology, 1605–1621 (Dec., 1987).

McLeod, Jr., Harry O., *Matrix Acidizing*, Journal of Petroleum Technology, 2055–2069 (Dec., 1984).

Holditch, S.A., *Factors Affecting Water Blocking and Gas Flow from Hydraulically Fractured Gas Wells*, Journal of Petroleum Technology, 1515–1524 (Dec., 1979).

Baker, B.D. and Wilson, J.C., *Stimulation Practices Using Alcoholic Acidizing and Fracturing Fluids for Gas Reservoirs*, SPE Paper 4836, presented at the SPE European Spring Meeting held in Amsterdam, The Netherlands, May 29–30, (1974).

Gidley, J. L., *Stimulation of Sandstone Formations with the Acid–Mutual Solvent Method*, Journal of Petroleum Technology, 551–558 (May, 1971).

Ribe, K.H., *Production Behavior of a Water–Blocked Oil Well*, SPE 1295–G (1959).

\* cited by examiner

Primary Examiner—Philip Tucker
(74) Attorney, Agent, or Firm—Thomas O. Mitchell; Catherine Menes; Brigitte Jeffery

(57) ABSTRACT

Methods are provided for increasing the production of hydrocarbons from shaly formations that contain adsorbed condensed hydrocarbon gases by treating such formations with dewatering compositions comprising surfactants that cause the surfaces of the formation to be or to remain oil-wet. The methods may be used in stimulation (acidizing or acid fracturing or hydraulic fracturing), remediation or workover, and in enhancing flow from natural fractures or from unstimulated formations.

16 Claims, No Drawings

METHODS FOR DEWATERING SHALY SUBTERRANEAN FORMATIONS

TECHNICAL FIELD OF THE INVENTION

The present Invention relates to hydrocarbon production, particularly to methods of enhancing gas production from shaly formations having high water saturations, and more particularly to reducing water saturations in the formation immediately surrounding either a wellbore or a fracture face by treating the formation with surfactants having good oil-wetting characteristics in the presence of shale. Reduction of water saturation increases the flow of hydrocarbons in these formations. The methods may be used in drilling, completion, stimulation (acidizing or acid fracturing or hydraulic fracturing), remediation or workover, and in enhancing flow from natural fractures or from unstimulated formations.

BACKGROUND OF THE INVENTION

The present Invention relates generally to hydrocarbon (petroleum and natural gas) production from wells drilled in the earth. Hydrocarbons are obtained from a subterranean geologic formation (i.e., a "reservoir") by drilling a wellbore that penetrates the hydrocarbon-bearing formation. In order for the hydrocarbons to be produced, that is, travel from the formation to the wellbore, and ultimately to the surface, at rates of flow sufficient to justify their recovery, a sufficiently unimpeded flowpath from the subterranean formation to the wellbore, and then to the surface, must exist or be provided. Obviously, it is desirable to maximize both the rate of flow and the overall amount of flow of hydrocarbon from the subsurface formation to the surface, where it can be recovered.

Hydrocarbon production is typically limited by two major reservoir factors: porosity and permeability. Even if the porosity is adequate, the effective permeability to the hydrocarbon may be limited. When more than one fluid is present in a permeable system, the flow of each is affected by the amount and distribution of the other(s); in particular the relative flows are affected by which fluid is the "wetting" phase, that is the fluid that coats the surfaces. Depending upon many factors, one fluid may flow while another does not. The result of stagnant fluid in the formation naturally diminishes the rate of hydrocarbon recovery. The reasons for this are both simple and complex. Most simply, the presence of fluid, in particular water or brine, in the formation acts as a barrier to the migration of hydrocarbon from the formation into the wellbore. More precisely, aqueous-based fluid injected during well treatments may saturate the pore spaces of the treated region, preventing the migration of hydrocarbon into and through the same pore spaces. In an analogous manner, if the well is to be produced without first stimulating, naturally occurring aqueous fluids in the formation in the flowpath or potential flowpath may hinder the production.

Indeed, diminished effective permeability caused by stagnant fluid often limits hydrocarbon production (both rate and capacity) from a given well. To achieve an increase in well productivity therefore involves removing stagnant fluid from the formation. No completely satisfactory method exists to remove these fluids, and therefore prevent them from reducing production.

In the natural state, formations may be oil-wet, water-wet or of mixed wettability, depending upon the nature of the fluids and the formation. (In this and following discussions, "oil-wet" is meant to include surfaces that are "wet" by adsorbed, condensed or compressed gas as well.) When the internal surface of an oil or gas producing formation or fracture face pore is oil-wet, the oil phase will occupy the pore surface as well as the smallest, least permeable flow paths. As such, the oil or gas will have to flow through a restricted pathway to be produced, and the water, which is non-wetting, will be able to flow through the high permeability, least restricted, flow path. Therefore, in order to maximize oil or gas flow capacity, it is generally preferred that the pore surface be water wet.

One exception to that recommendation has been the specific case of the recovery of methane from coal seams. In such types of formations, most gas in coal is adsorbed onto the very high internal surface area of the oil-wet organic constituents of the coal, and consequently, coals are described as being normally oil-wet, unlike in conventional gas reservoirs that are composed of inorganic minerals that are normally water-wet. In U.S. Pat. No. 5,229,017, Nimerick et al. teach that treating coal formations with dewatering agents to create persistent oil-wet coal surfaces enhances gas production by reducing the tendency of formation fines migration and increasing the drainage of water from the formation. More specifically, Nimerick et al. disclose the use of some organic surfactants selected from butylene oxide derivatives or polyethylene carbonates for hydraulic fracturing.

However, Nimerick et al. do not address other conventional reservoir operations such as drilling, completion, remediation, acidizing, acid fracturing, or enhancing flow in natural fractures, nor do they address treatment of conventional gas reservoirs that are normally water-wet or have become water-wet, or in which the producible hydrocarbons are in a porous mineral matrix such as shale formations like the Devonian Shale and the Barnett Shale. For those conventional formations, the common prejudice remains that water-wet surfaces are preferable.

It has been observed that when the formation is a shale that has a high water content, production of hydrocarbons, particularly if they are in the formation substantially as adsorbed, condensed gas, may be delayed and slow. The problem typically occurs in gas wells such as those in shale formations that contain high concentrations of adsorbed gas, primarily natural gas (that we will refer to as "methane" in the following discussions), as opposed to those that contain primarily compressed but not adsorbed gas. For those wells, it is imperative to remove the water as quickly and completely as possible to maximize production rate and total methane recovery. In this way the operator can apply maximum pressure drawdown in the formation rather than in the wellbore. Water in the formation impedes gas desorption and flow.

For those shaly formations containing adsorbed hydrocarbon gas, the inventors have found that it would be acceptable for the formation to be oil-wet during gas productions because this allows the water to be removed more quickly and more completely and open more of the pore to gas flow. It is also advantageous to minimize fines migration, since fines block flow paths throughout the production system, from the formation to downhole equipment to surface equipment. In general, these same factors and arguments, with appropriate modification to suit the specific situations, pertain to stimulation (acidizing or acid fracturing or hydraulic fracturing), remediation or workover, and in enhancing flow from natural fractures or from unstimulated formations.

SUMMARY OF THE INVENTION

There are many oil and gas well operations in which the formations are oil-wet or become oil-wet and the presence of significant amounts of water in pores or fractures is detrimental. The common denominator of the methods encompassed in this Invention is that they all deal with enhancing the recovery of hydrocarbons from subterranean formations that contain adsorbed and compressed hydrocarbon gases, especially methane, in shale rich matrixes and that the enhancement is accomplished by causing the formation to be or to remain oil-wet, thus promoting dewatering of the shale and maximizing flow paths for the hydrocarbons. By "causing the formation to be or to remain oil-wet", we mean that if the formation is water-wet it becomes oil-wet and continues to be oil-wet while a sufficiently large volume of water or brine flows through and is removed from the formation to produce the results desired from the treatment method, and if the formation is oil-wet it continues to be oil-wet while a sufficiently large volume of water or brine flows through and is removed from the formation to produce the results desired from the treatment method. By "adsorbed and compressed" gas we mean that the formation contains adsorbed gas on surfaces and additional gas contained within the formation pores in a compressed state.

We have discovered that specific types of dewatering agents that leave a long-lasting oil-wet surface substantially increase the dewatering of shale, speed up the production of gas, and increase the total gas produced. In particular, those agents comprise:

(a) organic surfactant compounds having the formula R1-(EOx-PrOy-BuOz)H wherein R1 is an alcohol, phenol or phenol derivative or a fatty acid having 1 to 16 carbon atoms, EO is an ethylene oxide group and x is 1 to 20, PrO is a propylene oxide group and y is 0 to 15, and BuO is a butylene oxide group and z is 1 to 15;

(b) an organic polyethylene carbonate having the formula $$R2\text{-}(\text{---}CH2\text{-}CH2\text{-}O\text{---}C(O)\text{---}O\text{---})qH$$

wherein R2 is an alcohol having 7 to 16 carbon atoms and q is 7 to 16;

(c) butoxylated glycols having 1 to 15 butylene oxide groups;

(d) ethoxylated-butoxylated glycols having 1 to 5 ethylene oxide groups and 5 to 10 butylene oxide groups; and (e) alkyl-aminocarboxylic acids or carboxylates.

These dewatering agents have good oil-wetting characteristics. The ability to reduce the water saturation in a gas containing shale will increase the relative permeability to gas in the formation. This increased permeability to gas will improve well performance and substantially improve the economic value of oilfield treatments employing fluids that contain these dewatering agents. Tenacious adsorption of the dewatering agent onto the shale surface maintains an oil-wet condition, thus facilitating reduction of the water saturation in the shale. Surfactants that result in water-wet formation surfaces will not be suitable.

One embodiment is a method for dewatering a shaly hydrocarbon bearing subterranean formation comprising adsorbed and compressed gas comprising the steps of contacting the formation with an effective amount of a well treatment fluid comprising one or more than one of a dewatering agent that causes the formation to be and to remain oil-wet; and removing water from the formation.

Another embodiment is a method for enhancing gas production from a shaly hydrocarbon bearing subterranean formation comprising adsorbed and compressed gas comprising the steps of contacting the formation with an effective amount of a well treatment fluid comprising one or more than one of a dewatering agent that causes the formation to be and to remain oil-wet; removing water from the formation; and removing gas from the formation.

Still another embodiment of the present Invention is a method of hydraulically fracturing a shaly subterranean formation containing high concentrations of adsorbed and compressed gas. This method comprises the step of injecting the well treatment fluid composition of the Invention via a wellbore into the formation at a flow rate and pressure sufficient to produce or extend a fracture in the formation. The well treatment fluid comprises one or more surfactants that create or maintain an oil-wet surface. The dewatering agents will be particularly effective at promoting the recovery of the injected fracturing fluid from the formation near the fracture face where it was driven into the pores during the hydraulic fracturing treatment. Moreover, the water containing surfactant can also contain a wide variety of functional additives that are known to improve the performance of fracturing treatments. Such functional additives include polymers, crosslinkers, breakers, biocides, scale inhibitors, proppant, and others.

Other embodiments of the present Invention provide a remedial treatment or workover of gas wells in a shaly subterranean formation containing high concentrations of adsorbed and compressed gas to enhance dewatering and the production of gas. These methods comprise the step of injecting, into a well that has been producing for some time and may or may not already have been stimulated (fractured and/or acidized) in the past, and may contain natural fractures, the well treatment fluid composition of the Invention via a wellbore into the formation at a flow rate and pressure less than the fracturing pressure.

Further embodiments comprise acidizing and acid fracturing in shaly subterranean formations containing high concentrations of adsorbed and compressed gas, that is methods as described above in which the injected fluid promotes dewatering and further comprises an acid and is injected either above or below the formation fracture pressure.

Yet another embodiment is a drilling or completion fluid comprising one or more of the shale dewatering agents described above.

These and other embodiments may use foamed or energized fluids if the selected surfactants are known to create stable foams, or if the fluids further comprise foamers and the selected surfactants are not anti-foamers.

Other embodiments will be apparent to those skilled in the art of production of subterranean fluids.

DETAILED DESCRIPTION OF THE INVENTION

In accordance with the Invention, an aqueous well treatment fluid is used in well treatment of shaly formations containing adsorbed and compressed hydrocarbon gases. In the term "well treatment" we include drilling, completion, remediation, stimulation (acidizing or acid fracturing or hydraulic fracturing), and enhancing flow from natural fractures or from unstimulated formations. Any of these well treatments, except of course drilling and the drilling portion of completion, may be repeated if desired or necessary in the normal course of management of a well or reservoir. Various oilfield treatments often must be repeated because of changes in flow patterns or rates, often in turn caused by changes in temperature or pressure or by deposition of scales, paraffins, asphaltenes, etc. The treatments of this Invention may include the first time such a treatment is performed in a given well or formation or a subsequent treatment (in which case the first treatment may or may not have been performed according to the methods of this Invention). The fluid includes a dewatering agent for facilitating the removal of water from the formation, the fracture or acidized face, if there is one, and the region of the formation near the fracture, acidized region or wellbore.

In the following discussion, by "shale" we mean a compacted sedimentary formation in which the constituent mineral particles are predominantly very fine clay, silt or mud but may contain small amounts of other materials such as sandstone, carbonates or kerogen. By "shaly" we mean formations in which the mineral content is greater than about 40% clay or shale, as opposed to sandstone or carbonate. By "coal" we mean a combustible rock composed primarily of plant material compressed and altered by time, pressure and temperature into an organic material having a high carbon content; coal may contain some shale or other minerals. By "water" we mean an aqueous fluid that may contain organic or inorganic; indigenous or added; solid, liquid or gaseous materials dissolved or suspended therein, such as salts, carbon dioxide, nitrogen, alcohols, water-miscible components of petroleum, etc. Most particularly by water we mean formation water or brine or aqueous wellbore treatment fluids.

Treatment of shaly reservoirs that contain significant concentrations of adsorbed gas requires techniques quite different from those used in conventional sandstone or carbonate reservoirs. The well treatment methods are applicable to formations in which from about 1% to about 100% of the hydrocarbon gas is adsorbed hydrocarbon gas (particularly methane) especially from about 5% to about 100%, and most particularly from about 20% to about 100%. As the pressure in the formation is reduced, at a certain pressure, the critical methane desorption pressure governed by the Langmuir desorption isotherm, the methane will begin to desorb from the formation. In addition, such formations are often substantially or completely saturated with water. In these cases, large quantities of water must be removed in order to lower the reservoir pressure to a point below the critical methane desorption pressure. Therefore, a well treatment carried out in such a formation must be designed to produce water effectively. Maintaining the shale in an oil-wet state facilitates water production.

Normally, as was discussed above, it is believed by those skilled in the art of recovery of hydrocarbons from conventional (as opposed to coal) subterranean formations that it is most preferable to maintain the formation in a water-wet condition. References discussing the effect of formation wettability on oil production include: Anderson, William G., *Wettability Literature Survey-Part 5: The Effects of Wettability on Relative Permeability, Journal of Petroleum Technology* 1453–1468 (November, 1987); Anderson, William G., *Wettability Literature Survey-Part 6: The Effects of Wettability on Waterflooding, Journal of Petroleum Technology*, 1605–1621 (December, 1987); McLeod Jr., Harry O., *Matrix Acidizin, Journal of Petroleum Technology*, 2055–2069 (December, 1984); and Ribe, K. H., *Production Behavior of a Water-Blocked Oil Well*, SPE 1295-G (1959).

Moreover, the following reference teaches methods of ensuring that formations are water-wet. Gidley, J. L., *Stimulation of Sandstone Formations with the Acid-Mutual Solvent Method, Journal of Petroleum Technology*, 551–558 (May, 1971). The following references describe the effects of wettability in gas producing formations: Holditch, S. A., *Factors Affecting Water Blocking and Gas Flow from Hydraulically Fractured Gas Wells, Journal of Petroleum Technology*, 1515–1524 (December, 1979); and Baker, B. D. and Wilson, J. C., *Stimulation Practices Using Alcoholic Acidizing and Fracturing Fluids for Gas Reservoirs*, SPE Paper 4836, presented at the SPE European Spring Meeting held in Amsterdam, The Netherlands, May 29–30, 1974.

However, we have found that under certain circumstances maintaining the formation in an oil-wet condition is preferred.

In accordance with the Invention, the dewatering agent is an organic surfactant selected from a group consisting of:

(a) organic surfactant compounds having the formula R1-(EOx-PrOy-BuOz)H wherein R1 is an alcohol, phenol or phenol derivative or a fatty acid having 1 to 16 carbon atoms, EO is an ethylene oxide group and x is 1 to 20, PrO is a propylene oxide group and y is 0 to 15, and BuO is a butylene oxide group and z is 1 to 15;

(b) an organic polyethylene carbonate having the formula

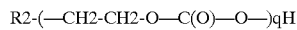

R2-(—CH2-CH2-O—C(O)—O—)qH wherein R2 is an alcohol having 7 to 16 carbon atoms and q is 7 to 16;

(c) butoxylated glycols having 1 to 15 butylene oxide groups;

(d) ethoxylated-butoxylated glycols having 1 to 5 ethylene oxide groups and 5 to 10 butylene oxide groups; and (e) alkyl-aminocarboxylic acids or carboxylates.

Where the surfactants contain one or more than one of ethoxy, propoxy and butoxy units, the exact order of these units within the molecule is not critical. Since the R group can be derived from a natural product, the R group can have a distribution of carbon atoms. Surfactants useful in the present Invention include those described by Nimerick et al. in U.S. Pat. No. 5,229,017 (assigned to Schlumberger Technology Corporation). This patent is hereby incorporated by reference in its entirety. A process for preparing organic polyethylene carbonates is given in U.S. Pat. No. 4,330,481. This patent is hereby incorporated by reference in its entirety. The surfactants in a) and b) above are described here with slightly different structural formulas than in U.S. Pat. No. 5,229,017.

Other surfactants that are useful in the present Invention are described in U.S. patent application Ser. No. 09/513,429 by England et al. (filed Feb. 25, 2000; assigned to Schlumberger Technology Corporation) which describes several foaming agents for release of methane from coal that have similar functional properties as the organic surfactants in U.S. Pat. No. 5,229,017. That application describes methods that require surfactants that are effective both for oil-wetting and for foaming. The surfactants of that application that provide oil-wetting, and only those that provide oil-wetting, will be effective in the present Invention whether or not they provide foaming. In fact, one class of surfactants (alkyl-aminocarboxylic acids or carboxylates), which was shown in that application to be not applicable, is applicable in the present Invention. U.S. patent application Ser. No. 09/513,429 is hereby incorporated by reference in its entirety Particularly preferred examples are alcohols substituted with ethylene oxide and butylene oxide (such as butanol having about 3 ethylene oxide units and about 5 butylene oxide units); di-secondarybutylphenol having about 5 ethylene oxide units and about 4 butylene oxide units; decanol having about 10 ethylene carbonate units; a mixture of diethyleneglycol monobutyl ether, triethyleneglycol monobutyl ether and higher glycol ethers having about 4 ethylene oxide units and about 6 butylene oxide units; tridecyl alcohol having about 7 to 8 ethylene oxide and about 3 to 4 butylene oxide units; tridecyl alcohol having about 7 ethylene oxide units and about 1 to 2 butylene oxide units; and triethylene glycol monobutyl ether-formal, which has the formula (BuO(—CH2-CH20)3)2CH2.

Another suitable surfactant comprises an alkyl-aminocarboxylic acid or carboxylate, more preferably an alkyl-aminopropionic acid or propionate. In one particular embodiment, the surfactant has the formula

R—NH—(CH$_2$)$_n$—C(O)OX wherein R is a saturated or unsaturated alkyl group having from about 6 to about 20 carbon atoms, n is from 2–6, and X is hydrogen or a salt forming cation. In various specific embodiments of the Invention, n can be from 2–4, most preferably 3; and R can be a saturated or unsaturated alkyl group having from about 6 to about 20 carbon atoms. Since the R group can be derived from a natural product, the R group can have a distribution of carbon atoms. One particular preferred surfactant is coco-aminopropionate.

Methods of drilling, stimulation (acidizing or acid fracturing or hydraulic fracturing), remediation or workover, and of enhancing flow from natural fractures or from unstimulated formations are well known to those skilled in the art of production of subterranean fluids. Drilling involves rotating a drill bit at the end of a drill string in a well while circulating a well treatment fluid (the drilling fluid). The drilling fluid functions to carry cuttings to the surface, to cool and lubricate the bit, and to control the flow of fluids from the wellbore into the formation or from the formation into the wellbore. Completion is drilling into the productive formation and carrying out certain steps to end the drilling process and enable hydrocarbon production from the desired zones. Remediation and workover are operations (such as deepening, pulling and resetting liners, etc.), performed to increase production from wells. Acidizing is treating a formation with acid to increase production by etching the rock, removing soluble damaging materials, and enlarging the pore spaces and passages. Hydraulic fracturing will be described in detail below. If hydraulic fracturing is carried out with an acidic fluid, it is referred to as acid fracturing. Reasons and methods for selecting all these methods and fluids for these methods, in particular for their chemical and physical properties relative to the formation, are well known to those skilled in the art of production of subterranean fluids.

The effective amounts of the surfactants of the present Invention can readily be determined by such persons without undue experimentation. These surfactants can be used over a wide range of concentrations, typically from 0.01 volume percent to 10 volume percent, but preferably between 0.05 volume percent to 10 volume percent, and most preferably between 0.05 volume percent to 0.5 volume percent of the treatment fluid. (Note that 1 volume percent is equivalent to 10 gallons per thousand gallons (gpt).) Similarly, the choice of surfactant can readily be made by commonly known methods by those skilled in the art of production of subterranean fluids upon evaluation of the nature of the surfaces and fluids (both indigenous and injected) involved, including taking into consideration other chemicals present in the indigenous or injected fluids and whether or not the treatment fluid is to be foamed or energized. The surfactants can be blended directly with fluids used in the various wellbore treatments listed above as the fluids are first formulated, or the surfactants may first be prepared as concentrates, particularly aqueous concentrates, and the concentrates then used in the preparation of the final fluids.

One example of a well treatment method of the Invention is hydraulic fracturing of a subterranean reservoir. Hydraulic fracturing is a standard practice for increasing oil or gas production from subterranean reservoirs. A wide variety of treatment designs are applied depending on the specific characteristics of the formation, the quality of the reserves, and the operating environment. However, all treatments share the requirements of creating new inflow surface area and ensuring that there is good hydraulic conductivity and connectivity between the wellbore and the reservoir. Any damage to the hydraulic fracture and to the formation surrounding the fracture can reduce the hydraulic conductivity and connectivity, thereby reducing the ability of the newly created inflow surface to allow passage of the desired quantities of oil and gas. Fracture damage takes many forms, but is located either in the fracture itself or in the formation immediately surrounding the fracture (the fracture face).

Fractures are most typically initiated using 1 to 4 gallons of a selected dewatering surfactant in accordance with the Invention per 1000 gallons of water. The water may be neat or a brine and may also contain low amounts of a polymeric (natural or synthetic) viscosifying agent. This stage, the pad, has high water leak-off (dependent upon permeability and differential pressure) into the formation and primarily is intended to initiate the fracture or fractures and to place the initial quantities of the dewatering surfactant in the formation. Following fracture initiation, additional fracturing fluid is pumped to attain wider fractures; this fluid typically contains higher polymer loadings (up to 40 to 60 lbs per thousand gallons). The polymer may be either crosslinked or uncrosslinked.

The well treatment fluid of the present Invention may also be used for remediation, that is to enhance water and gas recovery from "poor" producers that have previously been fractured and propped, or wells which contain some conductive drainage channels to the wellbore. In this treatment, water having little or no polymer loading is used to transport 2 to 4 gallons of the selected dewatering surfactant per 1000 gallons of fluid into the formation. This treatment is normally done at less than fracturing pressure to prevent dislodging the proppant that may be present in the fracture. The total volume of fluid containing the dewatering surfactant would depend on the formation height and the desired penetration of the treating fluid containing the dewatering surfactant.

The surfactants of the present Invention are adsorbed onto the surfaces, thereby increasing the hydrophobicity of the shaly formation. The preferred surfactants also are relatively tenaciously bound to the surfaces thereby preventing re-wetting and re-adsorption of water on the surfaces by the passage of subsequent volumes of water during the fracture fluid cleanup, formation drainage and hydrocarbon production processes. Thus the benefits can be realized over an extended period of hydrocarbon production. This feature of the surfactants offers the additional advantage that, since the surfactants are tenaciously bound to the surfaces, minor, if any, amounts are contained in the produced water, thereby greatly reducing any environmental discharge problems associated with the produced water. Further, the surfactants of this Invention inhibit the migration of fines within the formation, fracture face and fracture, thereby additionally enhancing and maintaining fracture conductivity.

Of course, all surfactants would eventually be washed off of any surface by a sufficiently large volume of surfactant-free water or brine. Satisfactory performance in the methods of this Invention is achieved if the surfactant remains on the surface long enough to achieve the desired results of a specific treatment. In particular, it should be noted that satisfactory performance, as measured by how tenaciously the surfactant is bound to a formation surface, could be different for surfactants that are also foaming agents as opposed to surfactants that are not. Treatment fluids are sometimes foamed or energized with gases for various reasons, such as to achieve some other more desirable result(s), such as to lighten the hydrostatic load during and after the treatment, use less base fluid, do less damage to the formation or to do less damage to a proppant pack or gravel pack, etc. While there is no intention to be bound by any theory of invention, it is believed that the surfactants of the Invention that are good foamers are inherently less strongly adsorbed to formation surfaces than are surfactants that are non-foaming or are anti-foaming agents. Thus when using surfactants that are known to create stable foams, a sufficiently large volume of water or brine flowing through and being removed from the formation to produce the results desired from the treatment method, might be less than the volume acceptable with a surfactant that does not create a foam. This affect could be offset, if desired, by using a higher concentration of the surfactant in the treatment methods, or by repeating the treatment methods, as appropriate.

The present Invention can be further understood from the following laboratory experiments. A preferred surfactant of the Invention, Surfactant A, a product comprising branched tridecyl alcohol having about 7.5 ethylene oxide units and about 3.5 butylene oxide units, commercially available from Schlumberger, was used to illustrate the effectiveness of the surfactants of the Invention for minimization of fracture face skin in shale formations.

EXAMPLE 1

Experiments were conducted to evaluate the draining and saturation performance of Surfactant A in Barnett Shale. The concentrations of Surfactant A used to treat the shale were 0.0, 0.5, 2, and 4 gpt (gallons of additive per thousand gallons of fluid).

The following information was recorded during flow tests in shale packs:

1) The rate at which water filled the column of crushed core material, shown in Table 1.
2) The rate at which the water drained from the column of crushed core material, shown in Table 2.

The drainage experiments were indicative of surface tension reduction and of the dewatering capability of the treating fluid. The greater the volume of liquid that drained out of the pipette, the better performance of the treating fluids.

Procedure: The shale sample was crushed and its fragments were sieved between 30/100-mesh sieves. The fragments were packed (called a shale pack) into the pipette and held vertically with the pipette tip pointing down. A 100-mesh screen packed into the tip of a 5-ml pipette prevented the fragments from washing out of the pipette. The treating fluid, containing surfactant, fresh water, and 2% KCl, was injected into the top of the pipette using a 3-ml syringe. (The amount of shale in the 5-ml syringe was such that about 3-ml of treating fluid would saturate its pores.) Initially, the shale pack was dry, so it was possible to monitor the treating fluid as it saturated (Table 1) and then drained out of the shale pack (Table 2). Time was set to zero once the treating fluid interface fell to the shale pack surface (treating fluid now saturated the pack and was about to start draining from the pack, allowing air to invade from the top). The distance that the air had invaded the pack due to treating fluid drainage was recorded as a function of time.

Measurements were taken every 15 seconds for the "filling" test (see Table 1) until the shale pack was completely saturated. Measurements for the drainage test (see Table 2) were initially taken every 30 seconds for 5 minutes. Measurements were then recorded after 48 hours. Triplicate experiments were conducted to ensure good reproducibility.

It was observed, as shown in Table 1, that solutions with at least 1 gpt Surfactant A saturated the shale pack more quickly than 0.5 gpt Surfactant A, but the final saturated volumes were the same.

The drainage results shown in Table 2 indicate that the tap water achieved its maximum drainage volume very rapidly, after only 2 minutes of drainage. (Note that the "drainage volume" is not the volume of fluid collected from the pipette but rather the movement of the fluid interface in the pipette as indicated by the ml-markings on the pipette.) But, the tap water drainage volume was very small in comparison to the drainage volume of water containing Surfactant A. The 48 hour drainage volume was not significantly affected by the Surfactant A concentration in the water, but concentrations of 1 gallon Surfactant A per 1000 gallons of water (1 gpt Surfactant A) and higher caused more dewatering than 0.5 gpt Surfactant A in the first five minutes of drainage. The presence of Surfactant A in the treatment fluid increased the volume of liquid draining from the shale pack by approximately 270% over plain water.

TABLE 1

Filling Time (time it takes to completely saturate shale pack in minutes:seconds).

| Surfactant A Time | 0.5 gpt (ml) | | | 1 gpt (ml) | | | 2 gpt (ml) | | | 4 gpt (ml) | | |
|---|---|---|---|---|---|---|---|---|---|---|---|---|
| | Run 1 | Run 2 | Run 3 | Run 1 | Run 2 | Run 3 | Run 1 | Run 2 | Run 3 | Run 1 | Run 2 | Run 3 |
| 0:15 | 1.5 | 1.5 | 3.0 | 3.5 | 3.0 | 2.4 | 2.6 | 2.6 | 2.7 | 3.4 | 3.0 | 3.5 |
| 0:30 | 2.5 | 2.5 | 4.0 | 4.4 | 4.5 | 4.5 | 4.0 | 4.5 | 4.5 | 4.5 | 4.4 | 4.5 |
| 0:45 | 3.0 | 4.0 | 4.6 | 5.0 | 5.0 | 5.0 | 5.0 | 5.0 | 5.0 | 5.0 | 5.0 | 5.0 |
| 1:00 | 3.5 | 4.5 | 5.0 | | | | | | | | | |
| 1:15 | 3.8 | 5.0 | | | | | | | | | | |
| 1:30 | 4.5 | | | | | | | | | | | |
| 1:45 | 5.0 | | | | | | | | | | | |
| 2:00 | 5.0 | | | | | | | | | | | |

TABLE 2

Average of three runs of the amount of liquid drained from the pipette.

| Time (min:sec) | Tap Water (ml) | 0.5 gpt Surfactant A (ml) | 1 gpt Surfactant A (ml) | 2 gpt Surfactant A (ml) | 4 gpt Surfactant A (ml) |
|---|---|---|---|---|---|
| 0:30 | 0.20 | 0.35 | 0.28 | 0.26 | 0.30 |
| 1:00 | 0.60 | 0.58 | 0.67 | 0.53 | 0.57 |
| 1:30 | 0.80 | 0.83 | 0.93 | 0.93 | 0.82 |
| 2:00 | 1.00 | 1.17 | 1.27 | 1.23 | 1.33 |
| 2:30 | 1.00 | 1.77 | 1.97 | 1.87 | 2.03 |
| 3:00 | 1.00 | 1.90 | 2.17 | 2.13 | 2.33 |
| 3:30 | 1.00 | 1.97 | 2.33 | 2.30 | 2.33 |
| 4:00 | 1.00 | 2.07 | 2.40 | 2.43 | 2.33 |
| 4:30 | 1.00 | 2.07 | 2.40 | 2.50 | 2.33 |
| 5:00 | 1.00 | 2.07 | 2.40 | 2.57 | 2.33 |
| After 48 hrs | 1.00 | 2.73 | 3.03 | 2.77 | 2.60 |

EXAMPLE 2

The draining and dewatering capability of various materials was evaluated for samples of Barnett Shale with 2 gpt Surfactant A, 2 gpt Surfactant C (a mixture of isopropanol, 2-butoxyethanol, water, and ethoxylated C11 to C15 alcohols), 2 gpt Surfactant B (a mixture of methanol, isopropanol, water, and branched C9 to C11 alcohol ethoxylate with approximately 6 EO units per molecule) and 0.25 gpt Friction Reducing Agent D (hereinafter sometimes referred to as "FRA-D" (a mixture of acrylic polymer, aliphatic heavy naphtha, ethylene glycol, hydrotreated light distillate, oxyalkylated alkyl phenol and water). Of these materials, only Surfactant A is a shale dewatering agent suitable for use in the present Invention. Surfactants B and C are water-wetting agents that are commonly employed during well stimulation of sandstone and limestone reservoirs to improve recovery of the injected treatment fluids. Two additional tests included here show the shale dewatering capability of water containing 1 gpt Surfactant A; and 1 gpt Surfactant A with 10 gpt Scale Inhibitor (hereinafter termed "SI") available as PB 3525 from Nalco/Exxon Energy Chemicals, Houston, Tex., USA) and 10 ppt (pounds per thousand gallons) $CaCl_2$.

Experimental Methods: Cores were crushed and the fragments were sieved between 30/100-mesh sieves. Several types of tests were performed to determine whether additives are beneficial during Barnett Shale stimulation treatments. The tests included a) qualitative comparisons and b) quantitative capillary drainage experiments.

a) Qualitative Experiments Tests studying the reaction of shale material to treatment fluids in beakers were qualitative comparisons of the tendency of the shale to slough/disintegrate in the treatment fluid. Additional observations were made regarding the tendency of the treatment fluid to release and suspend shale fines. While there is no intention to be bound by any theory of invention, it is believed that treatment fluids that did not release fines into the aqueous treatment fluid and did not promote the suspension of fines are preferable.

The qualitative experiments were performed for better understanding of the effect of treatment solutions on the release of fines from the shale. One gram of shale material was placed in 100 ml of the treatment solution. The container was then vigorously shaken to disperse the fines. Observations were then made as the fines settled to the bottom of the bottle. Settling of the shale particles indicated that they were oil-wet and so they agglomerated or coalesced in the presence of an aqueous solution. This shows that the additive would be effective in the present Invention. When the shale particles remained in suspension, it indicated that they were water-wet. A total of 10 solutions were prepared. Solutions made with fresh water or 2% KCl, by weight in water, as a base fluid are listed in Table 3 with a brief description of the results.

TABLE 3

Qualitative Comparison: 1 g of Shale Material in Fresh Water and in Fresh Water with 2% KCl after Vigorous Shaking.

| Treating Solution | Fresh Water | Fresh Water with 2% KCl |
|---|---|---|
| Control | Fines floated on top layer, others settled to the bottom | Fines floated on top layer, others settled slowly to the bottom |
| 2 gpt Surfactant C | Shale dispersed in water and began to settle very slowly after ½ hour | Same as Control but slowest settling |
| 2 gpt Surfactant B | Shale dispersed in water and began to settle after ~10 minutes | Same as Control but slow settling |
| 2 gpt Surfactant A | Shale fines flocculated and began to settle after 1 minute | All shale very quickly sank to the bottom |
| 0.25 gpt Friction Reducing Agent D | Milky solution; shale began to settle after 1.5 minutes | Most shale sank very quickly but some continued to float |

Some notable observations are given here:

When Surfactant A was used as the potential dewatering agent, the shale fines very quickly sank to the bottom of the container in 2% KCl in water, and began to sink to the bottom within one minute in fresh water, prior to shaking the bottle. In all other cases, the fines were suspended at the treatment fluid surface until the bottle was shaken vigorously.

In the control experiments with no additives there was some shale settling in one hour after the vigorous shaking in both fresh water and fresh water with 2% KCl. However, there were still more floating particles than when any of the additives was used.

The shale fines settling time in Friction Reducing Agent D solution after vigorous shaking appeared to be the fastest regardless of whether the base water was fresh or contained 2% KCl (although shale settled even without shaking with Surfactant A, and began to settle sooner than with Friction Reducing Agent D after shaking with Surfactant A, and fines settled out of the treating solution containing Surfactant A second fastest). At 4 minutes, the fines in the bottle with Friction Reducing Agent D were already at the bottom of the bottle. However, the drainage tests below show that Friction Reducing Agent D is not a suitable shale-dewatering agent for the present Invention.

In fresh water, fines settled only very slowly from solutions containing Surfactants B or C. Settling was a little faster in 2% KCl, but settling of shale particles was slower in either base fluid with Surfactants B or C than in any other experiments, including the controls with no additives.

The fines settled out of treating solutions containing 2% KCl faster than the similar treating solution formulated in fresh water, i.e., fines settled out of a solution of 2 gpt Surfactant A in 2% KCl water faster than a solution of 2 gpt Surfactant A in fresh water.

After 24 hours, all the fines had settled to the bottom of all treatment solutions.

b) Quantitative Capillary Drainage Experiments Drainage experiments were conducted here to show the effect of different treatment fluids on shale dewatering. The total volume of fluid that drained from the pack of crushed shale was recorded (air replaced the fluid that drained from the pack). The greater the water volume that drained out of the column, the more effective was the treating fluid. The drainage experiments were indicative of surface tension reduction and of the dewatering capability of the treatment fluid. The total draining volumes from 30/100-mesh shale packs after 1 minute, 5 minutes and 24 hours are recorded in Table 4.

TABLE 4

Total Drained Volume after 24 hours period.

Volume of Treatment Fluid Drained from Pack (ml)

| Time | Fresh Water | 1 gpt Surfactant A | 2 gpt Surfactant A | 2 gpt Surfactant B | 2 gpt Surfactant C | 2 gpt FRA-D | 1 gpt Surfactant A, 10 gpt SI, 10 ppt CaCl$_2$ | |
|---|---|---|---|---|---|---|---|---|
| 1 min | — | 0.8 | 0.7 | — | — | — | — | — | — | 0.6 | 0.8 |
| 5 min | — | 1.2 | 1.0 | — | — | — | — | — | — | 1.1 | 1.3 |
| 24 hr | 0.8 | 1.3 | 1.4 | 1.7 | 1.65 | 0.7 | 1.2 | 1.0 | 0.6 | 1.1 | 1.3 |

Surfactant A had the best draining capability of all additives tested. After 24 hours, 1.7 ml of a 2 gpt Surfactant A treatment solution had drained from the pack compared with only 0.8 ml of fresh water drainage after 24 hours. Tests with different Surfactant A concentrations again indicated (as in example 1) that an increase in the concentration of Surfactant A can increase the drainage volume. Neither of the water-wetting Surfactants (B or C) performed as well as Surfactant A. Moreover, the polymer-based additive FRA-D had very poor dewatering characteristics. Finally, a scale inhibitor additive had minimal impact of Surfactant A performance.

The combined results of the qualitative and quantitative experiments of Example 2 indicate the superior performance of Surfactant A, the only one of the agents tested in Example 2 that is one of the dewatering agents of the Invention.

EXAMPLE 3

A wetting test was performed with Devonian shale using a modification of the method described in API Bulletin RP 42. The procedure consisted of the following steps.

1. Fill a glass jar with 50 ml of a 2% KCl solution and add 2 gpt of surfactant.
2. Place 5 grams of crushed shale into the solution prepared in Step 1 and mix for 60 seconds.
3. Decant the liquid from the slurry prepared in Step 2 into another glass jar.
4. Add 50 ml of kerosene to the jar containing the shale solids.
5. Mix the shale and kerosene, observe the dispersibility of the shale particles.
6. Add 50 ml of fresh water to the system from Step 5; mix and observe the dispersibility of the shale particles (this fresh water is considered one wash of the shale).
7. Fill another glass jar with 50 ml of a 2% KCl solution and add 2 gpt of surfactant.
8. Place 5 grams of crushed shale into the solution prepared in Step 7 and mix for 60 seconds.
9. Decant the liquid from the slurry prepared in Step 8 into another glass jar.
10. Add 50 ml of surfactant-free, fresh water to the shale; shake and decant the liquid. Repeat rinsing and decanting the shale with surfactant-free fresh water for a total of three times.
11. Add 50 ml of kerosene to the jar containing the shale solids.
12. Mix the shale and kerosene; observe the dispersibility of the shale particles.
13. Add 50 ml of fresh water to the system from Step 12; mix and observe the dispersibility of the shale particles (the addition of this fresh water constitutes the fourth shale wash).
14. Compare the results.

The following surfactants were tested:

Surfactant A

Surfactant E: a mixture of 12.4% Di-Secondary Butyl Phenol with 10 Moles EO and 30.7% Dicoco Dimethyl Ammonium Chloride in solvent Surfactant F: coco-aminopropionate Surfactant I: 50% FLUORAD FC-740 (a fluorinated alkyl ester available form 3M, St. Paul, Minn.) in heavy aromatic petroleum naphtha These tests were performed to demonstrate the effectiveness of the various surfactants for oil-wetting shale. These tests were also intended to demonstrate the ability of the oil-wetting surfactant to remain adsorbed to the shale after moderate washing with fresh water. The ability of the oil-wetting surfactant to maintain an oil-wet shale surface after washing the shale with fresh water is important because formation water will be free of surfactants. Should the surfactant wash off the shale surface easily, then the treatment will have too short a lifetime to be valuable.

The results are summarized in Table 5. The kerosene was always the upper (lower specific gravity) liquid phase in all the experiments.

TABLE 5

Summary of Shale Wettability Tests.

| System | Single Fresh Water Wash | Four Fresh Water Washes |
|---|---|---|
| 2 gpt Surfactant A in 2% KCl water | Fines are concentrated in upper (kerosene) layer. Layers remain slightly turbid. | Fines are concentrated in upper (kerosene) layer. Low turbidity in both kerosene and water. |
| 2 gpt Surfactant E in 2% | Fines are well dispersed in water layer, with highly | Kerosene layer is substantially clearer, fines |

TABLE 5-continued

Summary of Shale Wettability Tests.

| System | Single Fresh Water Wash | Four Fresh Water Washes |
| --- | --- | --- |
| KCl water | turbid kerosene layer. | remain concentrated and dispersed in the water layer. |
| 2 gpt Surfactant F in 2% KCl water | Clear water layer, fines are well dispersed in kerosene layer. | Fines remain strongly clumped together and dangle from interface into water layer. |
| 2 gpt Surfactant I in 2% KCl water | Some fines are at interfaces of a coarse kerosene-water emulsion upper layer, with most in highly turbid water layer. | Kerosene layer is substantially clearer, fines remain concentrated and dispersed in the water layer. |

After treatment of shale fines with 2 gpt Surfactant A in 2% KCl water and single or quadruple rinsing with fresh water, the smaller shale particles remained in the kerosene phase because they were oil-wet by Surfactant A. The water phase was almost clear because heavier shale particles had flocculated and settled to the bottom of the container. The appearance of the container contents was similar after one and four fresh-water washes because Surfactant A was so strongly adsorbed to the shale surface. This strong adsorption characteristic is very important for the longevity of treatments. Surfactant A is a non-foaming surfactant.

After treatment of shale fines with 2 gpt oil-wetting Surfactant E in 2% KCl water and single rinsing with fresh water, the shale fines resided primarily in the interfaces of a coarse kerosene-water emulsion, and the smaller fines were well distributed in the kerosene phase. However, by the fourth wash the surfactant was washing off of the shale as evidenced by the clarity of the kerosene phase (indicating that that phase no longer contained dispersed shale particles).

After treatment of shale fines with 2 gpt oil-wetting foaming Surfactant F in 2% KCl water and single rinsing with fresh water, the shale fines treated with Surfactant F resided primarily in the kerosene phase. The smallest fines were well distributed in the kerosene phase by this oil-wetting surfactant. The heavy fines flocculated and sank to the bottom of the water phase, which was very clear, indicating no dispersed, water-wet shale particles. Even after four fresh water washes, Surfactant F continued to provide some oil-wetting of the shale particles. The particles remained strongly flocculated at the interface and resisted settling into the still-clear water layer. Surfactant F can create stable foams, although it need not be used only when foams are desired or necessary.

After treatment of shale fines with 2 gpt water-wetting hydrocarbon foamer Surfactant I in 2% KCl water and single rinsing with fresh water, the fines resided primarily at the interfaces of a coarse kerosene-water emulsion. The smaller shale fines were well distributed in the water phase as evidenced by the high turbidity of the water layer. Continued shale washing reduced the emulsion/foaming of the fluids, and the shale became concentrated in the water layer as evidenced by the clarity of the kerosene phase.

The two oil-wetting surfactants of this invention in this example, Surfactant A and Surfactant F, created persistent oil-wet shale surfaces. Such persistence is important for the longevity of the treatment benefit. The other oil-wetting surfactant, Surfactant E, failed to maintain an oil-wet shale surface during the course of the experiments, and Surfactant I water-wetted the shale surface. Both results (water-wet shale and only very temporary oil-wet shale) will not provide a long term treatment benefit.

EXAMPLE 4

Devonian Shale Drainage Tests

A series of extremely severe drainage tests was performed to illustrate the particularly strong adsorption of Surfactant A to shale. Experiments were conducted to evaluate the draining and saturation performance of Surfactants A, E, F, G, H, and I in Devonian Shale. While there is no intention to be bound by any theory of invention, it is believed that in these experiments, surface tension reduction may play a more important role than in the experiments of Example 3. The concentrations of each surfactant used to treat the shale were 1 and 5 gpt (gallons of additive per thousand gallons of water). The additional surfactants used were:

Surfactant G: 2-butoxyethanol with C11–C15 linear ethoxylated alcohols

Surfactant H: coco benzyl ammonium chloride ethoxylate (with 2 moles of ethylene oxide)

The following information was recorded during flow tests in shale packs and is shown in Table 6:

1) The rate at which the treatment fluid filled the column of crushed Devonian shale.
2) The rate at which the treatment fluid drained from the column of crushed Devonian shale.
3) The rate at which surfactant-free water drained from the column of crushed Devonian shale after 90 pore volumes of surfactant-free water had been flushed through the Devonian shale column.

The drainage experiments were indicative of surface tension reduction and of the dewatering capability of the treating fluid. The greater the volume of liquid that drained out of the pipette, the better the performance of the treating fluid. Moreover, the drainage experiments that followed flushing the column with 90 pore volumes of surfactant-free water were indicative of the strength of the surfactant adsorption to the shale. Persistent surfactant adsorption to shale is highly desired as it will extend the lifetime of the treatment benefit.

Procedure: The shale sample was crushed and its fragments were sieved between 30/100-mesh sieves. The fragments were packed (called a shale pack) into a 5-ml pipette and held vertically with the pipette tip pointing down. A 100-mesh screen packed into the tip of the pipette prevented the fragments from washing out of the pipette. The treating fluid, containing surfactant, fresh water, and 2% KCl, was injected into the top of the pipette using a 3-ml syringe. Initially, the shale pack was dry, so it was possible to monitor the treating fluid as it saturated (second column in Table 6) and then drained out of the shale pack (third and fourth columns in Table 6). Time was set to zero once the treating fluid interface fell to the upper shale pack surface (treating fluid now saturated the pack and was about to start draining from the pack, allowing air to invade from the top). The extent to which the air had invaded the pack due to treating fluid drainage was recorded as a function of time. After 24 hours of drainage, 90 pore volumes of fresh water (containing no surfactants or any other additives) was then flushed through the shale pack. This fresh water flush represents water that is produced from shale formations. The fresh water was then monitored as it drained from the pack (after the 90 pore volume flush; fifth and sixth columns in Table 6). Time was reset to zero once the fresh water fluid interface fell to the shale pack surface (fresh water was about to start draining from the pack, allowing air to invade from the top). The distance that the air had invaded the pack due to fresh water drainage was recorded as a function of time.

Measurements were taken every 15 seconds for the "filling" test until the shale pack was completely saturated. Measurements for the drainage test were initially taken every 30 seconds for 5 minutes. Measurements were then recorded after 24 hours. Triplicate experiments were conducted to ensure good reproducibility. (Note again that the "drainage volume" is not the volume of fluid collected from the pipette but rather the movement of the fluid interface in the pipette as indicated by the ml-markings on the pipette.)

All the treatment fluids filled the shale packs between 1:30 (min:sec) and 2:45 (min:sec). Four of the six surfactants tested promoted or caused oil-wetting of the shale surface: Surfactant A, Surfactant E, Surfactant F, and Surfactant H. Surfactant G is a surface tension reducing water-wetting surfactant, and Surfactant I is an oil-soluble, hydrocarbon foamer that water-wets alumino-silicate minerals. The initial drainage tests (column 3 shows 15 minutes, and column 4 shows 24 hrs) are shown to establish the baseline drainage data for the surfactant-treated Devonian shale. Water-wetting Surfactant I was particularly poor in the initial drainage tests at low concentrations. The other surfactants caused good drainage due to their low surface tension properties. Good drainage is important for dewatering shale formations and enabling superior natural gas production from the wells. However, persistence of the oil-wet surface is essential and what makes the chemistry of this Invention dramatically superior to conventional oil-wetting surfactants. If the oil-wetting character is not persistent, then the ability to promote dewatering of the shale would rapidly diminish as surfactant-free water is produced from the formation. Comparison of the average drainage volume after 90 pore volumes of fresh water was flushed through the Devonian shale packs treated with the four oil-wetting surfactants (fifth and sixth columns of Table 6) indicates that Surfactant A created an oil-wet condition that survived this severe test. Such extreme persistence is particularly beneficial for effective shale dewatering. Not shown, is that although Surfactant F (a surfactant that can create stable foams) was ultimately substantially removed from the shale surface in this extremely severe test, it was removed more slowly than were Surfactants E and H. That is, the shale packs treated with the oil-wetting surfactants other than Surfactants A and F, as well as the water-wetting surfactants, very quickly lost their ability to drain water, because the surfactants desorbed and no longer provided their original benefit. Surfactant F slowly lost its ability; Surfactant A (a surfactant that cannot create stable foams) showed no loss of ability even in this extremely severe test. It is most noteworthy that not all surfactants that create an oil-wet surface meet the requirements for satisfactory surfactants of the Invention.

TABLE 6

Results of Devonian Shale Pack Filling and Drainage Tests. All tests were run in triplicate. The data shown here are average values.

| | Average fill time (min:sec) | Average Drainage Volume (ml in 15 min) | Average Drainage Volume (ml in 24 hrs) | Average Drainage Volume (ml in 15 min) after 90 pore volumes of fresh water | Average Drainage Volume (ml in 24 hrs) after 90 pore volumes of fresh water |
|---|---|---|---|---|---|
| 1 gpt Surfactant A | 2:20 | 1.0 | 1.4 | 1.4 | 1.6 |
| 5 gpt Surfactant A | 2:15 | 1.1 | 1.3 | 1.4 | 1.6 |
| 1 gpt Surfactant E | 2:00 | 1.2 | 1.6 | 0.3 | 0.4 |
| 5 gpt Surfactant E | 2:45 | 1.4 | 2.0 | 0.4 | 0.6 |
| 1 gpt Surfactant F | 1:30 | 1.6 | 2.0 | 0.4 | 0.7 |
| 5 gpt Surfactant F | 2:45 | 1.6 | 2.1 | 0.3 | 0.9 |
| 1 gpt Surfactant G | 1:45 | 0.9 | 1.5 | 0.2 | 0.6 |
| 5 gpt Surfactant G | 2:10 | 1.5 | 2.7 | 0.2 | 0.4 |
| 1 gpt Surfactant H | 2:15 | 0.7 | 1.2 | 0.3 | 0.6 |
| 5 gpt Surfactant H | 2:00 | 1.0 | 1.8 | 0.2 | 0.9 |
| 1 gpt Surfactant I | 2:05 | 0.2 | 0.7 | 0.2 | 0.5 |
| 5 gpt Surfactant I | 1:30 | 0.5 | 1.4 | 0.2 | 0.5 |

Satisfactory performance in any of the preceding examples is evidence that a surfactant will be suitable for use in the present invention.

While the present invention has been described with respect to a limited number of embodiments, those skilled in the art will appreciate numerous modifications and variations therefrom. It is intended that the appended claims cover all such modifications and variations as fall within the true spirit and scope of this invention.

Having thus described our invention, we claim:

1. A method for enhancing gas production from a shaly hydrocarbon bearing subterranean formation comprising adsorbed a compressed gas comprising the steps of
   i) contacting the formation with an effective amount of a well treatment fluid comprising one or more than one of a dewatering agent that is adsorbed and causes the formation to be or to remain oil-wet;
   ii) removing water from the formation; and
   iii) removing gas from the formation.

2. The method of claim 1 wherein water has previously been removed from the formation.

3. The method of claim 1 wherein gas has previously been removed from the formation.

4. The method of claim 1 wherein the well treatment fluid further comprises an acid.

5. The method of claim 1, wherein the well treatment fluid is foamed or energized and comprises a gas selected from the group consisting of nitrogen, air, carbon dioxide and combinations thereof.

6. The method of claim 1, wherein the well treatment fluid further comprises a viscosifying agent.

7. The method of claim 1 wherein said step of contacting the formation comprises pumping said well treatment fluid into a wellbore penetrating the formation at a rate and pressure sufficient to fracture the formation.

8. The method of claim 1 wherein the well treatment fluid further comprises an acid and said step of contacting the formation comprises pumping said well treatment fluid into a wellbore penetrating the formation at a rate and pressure sufficient to fracture the formation.

9. The method of claim 1 wherein said dewatering agent is selected from the group consisting of:
   a) organic surfactant compounds having the formula R1-(EOx-PrOy-BuOz)H wherein R1 is an alcohol, phenol or phenol derivative or a fatty acid having 1 to 16 carbon atoms, EO is an ethylene oxide group and x is 1 to 20, PrO is a propylene oxide group and y is 0 to 15, and BuO is a butylene oxide group and z is 1 to 15;
   b) organic polyethylene carbonates having the formula:

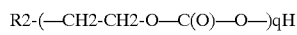

wherein R2 is an alcohol having 7 to 16 carbon atoms and q is 7 to 16;
   c) butoxylated glycols having 1 to 15 butylene oxide groups
   d) ethoxylated-butoxylated glycols having 1 to 5 ethylene oxide groups and 5 to 10 butylene oxide groups, and
   e) alkyl-aminocarboxylic acids or carboxylates.

10. The method of claim 9, wherein the alkylaminocarboxylic acid or carboxylate has the formula:

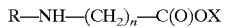

wherein R is a saturated or unsaturated alkyl group of from 6 to 20 carbon atoms, n is from 2–6, and X is hydrogen or a salt forming cation.

11. The method of claim 10, wherein n is 2 to 4.

12. The method of claim 11, wherein n is 3.

13. A The method of claim 12, wherein the surfactant is a coco-aminopropionate.

14. The method of claim 9, wherein the organic surfactant compound is a reaction product of tridecyl alcohol, ethylene oxide and butylene oxide.

15. The method of claim 14, wherein the organic surfactant compound is a branched tridecyl alcohol having about 7.5 ethylene oxide units and about 3.5 butylene oxide units.

16. The method of claim 1 wherein said shaly hydrocarbon bearing subterranean formation comprising adsorbed and compressed gas has previously been treated by a method selected from the group consisting of hydraulic fracturing, acid fracturing, remediation and acidizing.

* * * * *